Oct. 8, 1963  R. S. BRANNIN ETAL  3,106,371
MYOELECTRIC CONTROL SYSTEM
Filed Feb. 28, 1961  2 Sheets-Sheet 1

INVENTORS
RICHARD S. BRANNIN
JOSEPH E. ZUPANICK
BY

ATTORNEY

Oct. 8, 1963   R. S. BRANNIN ETAL   3,106,371
MYOELECTRIC CONTROL SYSTEM
Filed Feb. 28, 1961   2 Sheets-Sheet 2

INVENTORS
RICHARD S. BRANNIN
JOSEPH E. ZUPANICK
BY
ATTORNEY

United States Patent Office 3,106,371
Patented Oct. 8, 1963

3,106,371
MYOELECTRIC CONTROL SYSTEM
Richard S. Brannin, East Williston, and Joseph E. Zupanick, Westbury, N.Y., assignors to Sperry Rand Corporation, Great Neck, N.Y., a corporation of Delaware
Filed Feb. 28, 1961, Ser. No. 92,222
12 Claims. (Cl. 244—83)

The present invention relates to control of a device adapted to be controlled by a human operator where the human operator is substantially immobilized. The invention particularly relates to utilizing the electrical signals generated by a human muscle for controlling the device. The present invention is particularly suited for controlling navigable craft in flight but it is also suitable for other applications, especially those where bi-directional control is desired.

For convenience, the invention will be explained with respect to controlling the flight of a high performance aircraft and the limitations of the prior art methods will be described with respect to aircraft control.

Use of a conventional control column for controlling aircraft is only satisfactory when the aircraft has low performance capabilities. With high performance aircraft, the high acceleration forces experienced in rapid maneuvers at high speed makes control by means of a conventional control column very difficult because of the inertia of the control column as well as that of the pilot's arm. In the presence of these high "g" fields, much of the pilot's strength is utilized in merely supporting his arms and relatively little is available for positioning the control column. In addition, the relationship of the control column to both control surface deflection and aircraft dynamics is adjustable only through complicated mechanical devices such as variable gear and "artificial feel" systems. The operation of these compensating mechanisms is also impaired by the high "g" forces and their very existence increases the mechanical loads on the control system thereby making manual control under these conditions extremely difficult.

In order to overcome these disadvantages, electrical control stick steering has been suggested in which a pick-off on the control stick translates pilot force into an electrical signal. This electrical signal is amplified and applied to a servomotor which in turn positions a control surface. This system has a weakness in that a force pick-off is required. The combined pick-off control stick is itself susceptible to the acceleration forces of high "g" maneuvers causing undesirable and extraneous signals. These extraneous signals are generated due to the interaction of the inertia effects of the control stick and the pilot's arm in the presence of accelerations. Other undesirable signals may also be produced by cross coupling resulting from an improper physical relationship of the pilot's hand and arm with respect to the control stick.

It is therefore a primary object of the present invention to provide a control system that is responsive to a human operator although he may be substantially immobilized.

It is another object of the present invention to provide a control system for aircraft that is responsive to the desired signals initiated by the pilot but immune to external forces due to accelerations.

It is an additional object of the present invention to provide a control system for aircraft in which the signals are obtained directly in response to the human muscle activity.

It is a further object of the present invention to provide a bi-directional control system actuated in response to the operation of the muscular activity of a related pair of agonist and antagonist muscles.

These and other objects of the present invention are provided by a flight control system for aircraft which senses the degree of muscular activity of a related pair of agonist and antagonist muscles to provide electrical signals representative thereof. These signals are amplified, compared and the difference thereof applied to the servo operating means of the flight control system to control the characteristics of the engine and/or to control the deflection of the control surfaces. A system of this type for the purposes of this description will be known as a myoelectric control system, myoelectric meaning electricity of the muscle.

The myoelectric control system of the present invention provides the following advantages:

(1) It is immune to the deleterious effects of high "g" maneuvers.
(2) It is independent of high mechanical friction and other disturbing forces in the control system.
(3) It provides operational flexibility and versatility.
(4) It reduces the mechanical equipment required.

Referring now to the drawings.

The present invention is based upon the inherent functioning of the human muscles. A human muscle changes tension due to the spread of a wave of depolarization along its individual fibers. This depolarization is produced as a result of an electromechanical change at the neuromuscular junction which is initiated by a nerve impulse. In a large muscle, one nerve fiber may activate 100 to 200 individual muscle fibers. The total fibers triggered by a single nerve is called the motor unit. The integrated discharge of the total muscle fibers innervated by one nerve is called the electrical motor unit. This is the fundamental unit of muscular electrophysiology.

The waves of depolarization in an individual muscle fiber take the form of pulse trains. In a given fiber, the greater the nerve excitation the higher the frequency of the muscle fiber pulses, although the amplitude remains constant. The many fibers of a motor unit and of the muscle have different thresholds of excitation. In this manner the complete muscle is capable of smooth force changes over a considerable range. Muscles are unilateral force producing members in that they produce a force only in tension.

Figure 1:
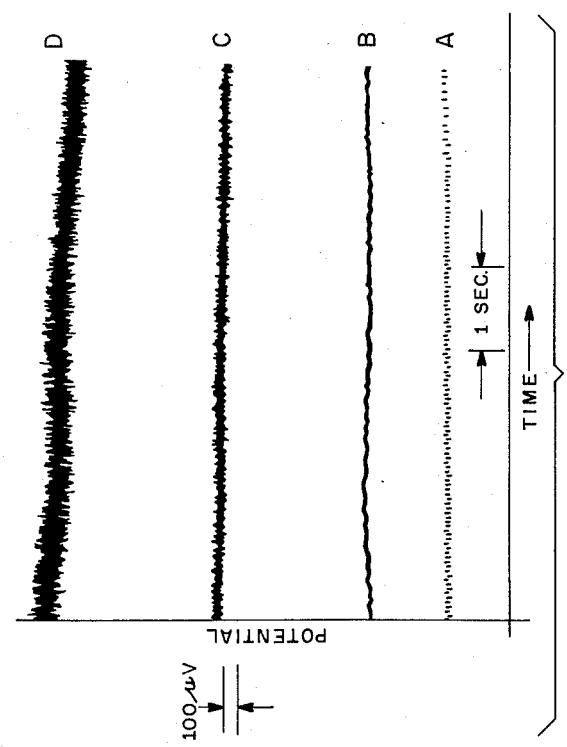
FIG. 1 is a graph of the potentials of an eye muscle as measured by a needle electrode inserted in the muscle wherein A are reference timing marks, B is the muscle at rest, C is with moderate muscle effort and D is with full muscle effort.

The depolarization potentials may be picked up from individual motor units by means of needle electrodes inserted directly into the muscle. These potentials depend upon the type of muscle. In general, they are of the order of 100 to 1000 microvolts and the pulse rates are from 5 to 200 per second. A typical recording of an eye muscle potential measured by a needle electrode is shown in FIGURE 1. The individual pulses of the motor units measured are evident. The recorded signal is from the muscle, not from the nerves exciting it.

There is no electrical activity of the quiescent muscle. So-called muscle tonus is not electrically recordable by any means known today. Also, there is no electrical signal produced in the presence of external forces unless the muscle is innervated by a conscious effort to resist these forces. A muscle potential is not present except when a nerve impulse is present to fire that muscle.

It has been found that these muscle potentials can be detected on the surface of the skin. Depending upon the location and arrangement of surface pick-offs, or electrodes, envelope patterns of electrical activity may be recorded rather than individual spikes. A surface pick-off tends to measure the integrated potentials of the individual motor units, that is the signal describes the activity of the whole muscle, in the area of the pick-off. These potentials are of the order of one millivolt rms.

Most skeletal muscles operate in pairs working in opposition to each other; these are the agonist and antogonist. It is desirable to use a muscle pair, such as the triceps and biceps, to provide two-way proportional control signals. In this fashion, the activity of the muscles associated with resisting external forces tend to cancel. When an agonist contracts, its antagonist relaxes and vice versa. The signals from the antagonistic muscles are similar in type to the agonist signals, but they occur at opposite time intervals.

Figure 2:
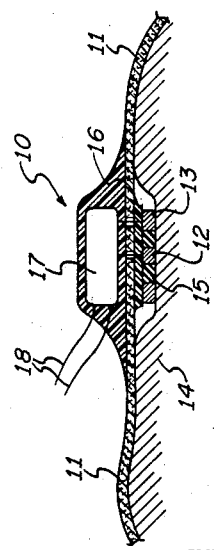
FIG. 2 is a side view in section of a myoelectric pick-off mounted contiguous with a muscle.

A suitable myoelectric pick-off incorporating built-in amplification is shown in FIG. 2. The pick-off 10 is shown installed in a flight jacket in order that the concentric silver electrodes 12 and 13 contact the skin surface 14. The center electrode 12 is a polished silver disc insulated from the encircling polished silver ring electrode 13 by a ring 15 of insulating material such as epoxy resin. The electrodes 12 and 13 are mounted on a base 16 which also has mounted thereon an incapsulated single stage transistor amplifier 17. The electrodes 12 and 13 are connected to the amplifier 17 to provide an amplified pick-off signal on the output leads 18. The electrodes 11 and 13 of the pick-off 10 are preferably relatively small in order to provide a high degree of isolation of muscle activity measurement. The pick-off 10 senses the degree of muscular activity of the muscle that it is contigous with and provides an electrical signal representative of the degree of muscular activity.

Figure 3:
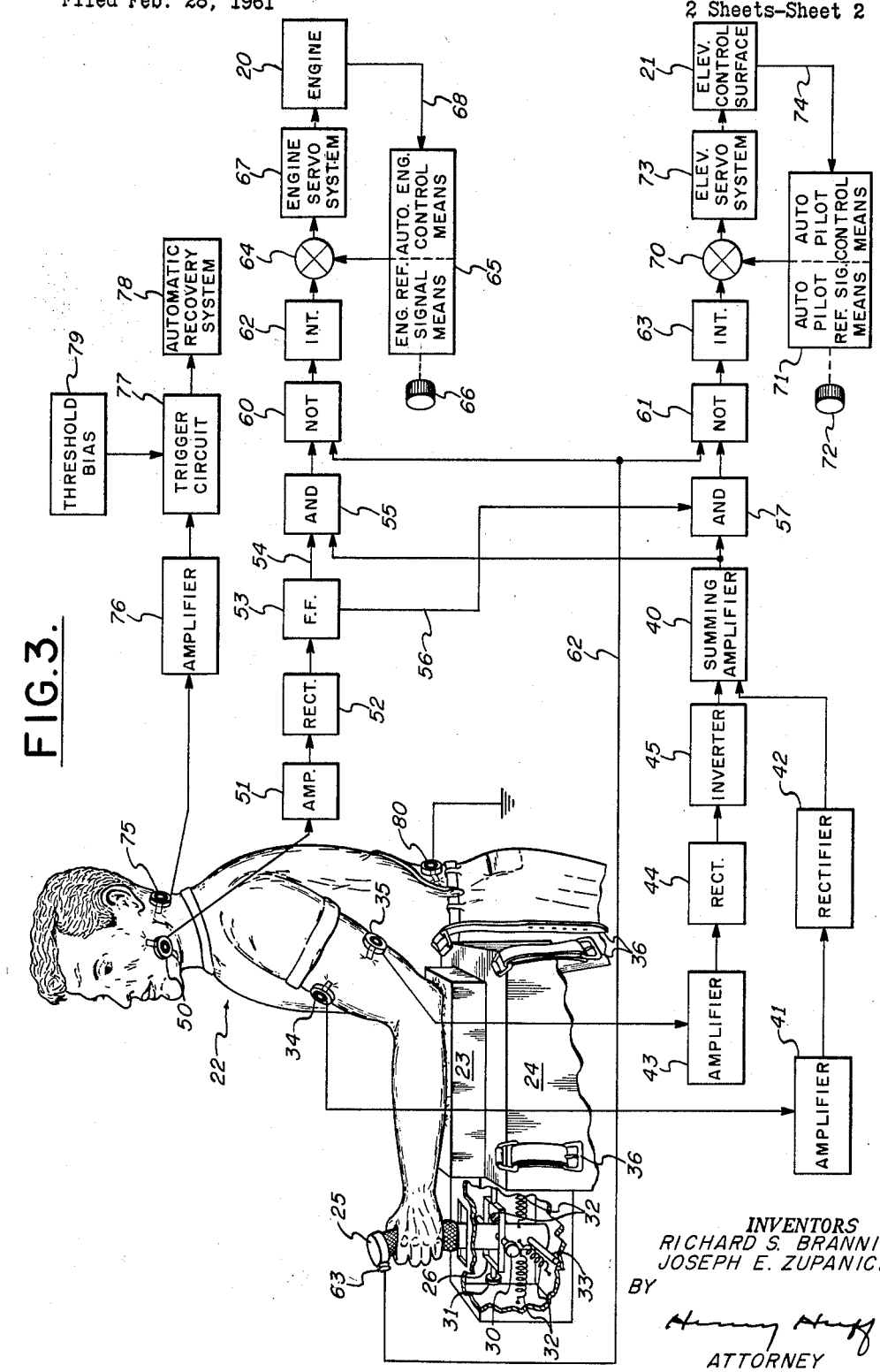
FIG. 3 is a schematic diagram showing a myoelectric control system in block form applied to control an aircraft by controlling the engine performance and pitch attitude.

The electrical signal representative of the degree of muscular activity will be described, for purposes of example, applied to an aircraft control system of FIG. 3. To simplify the explanation, the aircraft control system of FIG. 3 is shown controlling only the thrust of the engine 20 and the pitch attitude of the aircraft by means of the control surface 21. It being appreciated however that the present invention may be applied to other control systems in general and to other parameters of an aircraft control system.

Referring now to FIG. 3, a human pilot 22 is shown with the forepart of his arm resting on a sponge rubber pad 23 that in turn is supported on a platform 24. His hand is gripping a control stick 25 which is pivotally supported in a gimbal 26 for movement in the fore and aft and athwartship directions. Conventional pick-offs 30 and 31 responsive to the movement of the control stick 25 provide electrical signals representative of the desired pitch and roll command signals initiated by the pilot 22.

The control stick 25 is resiliently centered by means of four centering springs 32. The control stick 25 may be of the type shown in U.S. Patent 2,895,086 issued July 14, 1959 to R. H. Pettit. In a conventional flight control system, the signals from the pick-offs 30 and 31 are introduced into the pitch and roll channels respectively of an automatic pilot flight control system to control the respective elevator and aileron control surfaces for maneuvering the aircraft. It will be readily appreciated that this is the type of system in which, as mentioned above, the inertia of the control stick 25 and the inertia of the pilot's arm when subjected to high acceleration fields results in erroneous signals from the pick-offs 30 and 31 being introduced into the automatic pilot system.

The present invention overcomes this undesirable effect by maintaining the control stick 25 stationary by means of a pin 33 which secures the control stick 25 to an extension of the platform 24 and by utilizing signals representative of the desired aircraft attitude or condition which are generated directly from the pilot's muscles. In the embodiment of the invention shown in FIG. 3, the signals representative of the pitch command signals are obtained from myoelectric pick-offs 34 and 35. Each of the pick-offs 34 and 35 may be of the type shown in FIG. 2.

The pick-off 34 is mounted contiguous with the bicep muscles of the pilot while the pick-off 35 is mounted contiguous with the tricep muscles. The bicep and tricep arm muscles form a related pair of agonist and antagonist muscles. The pick-offs 34 and 35 are located in such a manner that the combination thereof provides two-way proportional control signals emanating therefrom. Any undesirable difference between the pick-off signals is compensated by conventional electronic compensation methods. The pick-offs 34 and 35 may be mounted contiguous with their associated muscles by being taped thereto as shown in FIG. 3 or by being mounted in the flight jacket shown in FIG. 2 or any other suitable arrangement. In order to render the pilots' forearm substantially immobile when subjected to high acceleration fields, it may be secured to the platform 24 by means of restraining straps 36.

In order to provide for two-way proportional control, the pick-off 34 is connected to a summing amplifier 40 through a preamplifier 41 and a rectifier 42 while the pick-off 35 is connected to the summing amplifier 40 through a preamplifier 43, a rectifier 44 and a polarity inverter 45. Since the electrical signals generated by agonist muscles are similar to and of the same polarity as those generated by antagonist muscles, it is desirable to invert the polarity of the signals from one of the muscles in order to provide bi-directional control. This may be done by means of the polarity inverter 45 or it may be accomplished by merely connecting the output terminals of one of the rectifiers 42 and 44 oppositely with respect to the other.

The output signal from the summing amplifier 40 is then representative of the sum of the signals from the pick-offs 34 and 35 and has a polarity in accordance with the signals from the pick-off having the greater potential, i.e., the greater muscular activity, and a magnitude representative of the difference between the two signals, i.e., the difference between the degrees of muscular activity. The output signals from the summing amplifier 40 may then be utilized to provide bi-directional control. For example, they may be applied as the command signals in a conventional automatic pilot system to control the up and down movement of the elevator for changing the pitch attitude of an aircraft.

In the embodiment of the control system shown in FIG. 3, the signals from the summing amplifier 40 are utilized to control either the elevator control surface 21 or to control the performance of the engine 20 in a manner to be described. A third myoelectric pick-off 50 is mounted contiguous with the jaw muscles of the pilot 22 to provide a signal when the pilot flexes his jaw muscles. The pick-off 50 is connected through a preamplifier 51 and a rectifier 52 to a flip flop 53 which may be in the form of a bistable multivibrator. One output terminal of the flip flop 53 is connected by means of a lead 54 to an AND circuit 55 while the other output terminal of the flip flop 53 is connected by means of a lead 56 to an AND circuit 57. The AND circuits 55 and 57 may be in the form of AND gate circuits which are common in logic computer applications to provide an output only when every input is in its prescribed state.

The AND circuits 55 and 57 are connected to respective input terminals of NOT circuits 60 and 61. The NOT circuits 60 and 61 may be in the form of NOT gate circuits which are common in logic computer applications to prevent any output when one of its inputs is in a prescribed state. In order to prevent the signals from the AND circuits 55 and 57 from controlling the performance of the engine 20 and the elevator control surface 21, the other input terminals of the NOT circuits 60 and 61 are connected by means of a lead 62 to a control switch 63 which is mounted on the pistol grip of the control stick 25. The output terminals of the NOT circuits 60 and 61 are connected to integrating devices 62 and 63, respectively. The integrators 62 and 63 may be electromechanical integrators of the motor-generator type or R.C. circuits having long time constants. The output terminal of the integrator 62 is connected to an input terminal of an algebraic summation device 64.

The other input terminal of the summation device 64 is connected to an automatic engine control means 65 which includes an engine reference signal providing means in order to provide an output from the engine control means 65 that is representative of the deviations of the engine from a predetermined reference condition. The engine control means 65 for example may be an aircraft jet engine fuel control system of the type disclosed in Serial No. 63,946 of E. Joline filed October 20, 1960 entitled Fuel Control System for Gas Turbine Engines.

In that event, a reference signal representative of a desired fuel flow rate is established by adjusting the engine reference signal knob 66. With the automatic engine control means 65 responsive to the actual operating condition, for example r.p.m. of the engine 20 by means of the feedback connection 68, the signal from the engine control means 65 has an amplitude and polarity representative of the magnitude and direction respectively of the deviation from the desired fuel flow. This deviation signal and the signal from the integrator 62 is algebraically combined in the summation device 64 and applied as a control signal to the engine servo system 67 to control the performance of the engine 20, for example by controlling the fuel flow rate.

The output terminal of the integrator 63 is connected to an input terminal of an algebraic summation device 70. The other input terminal of the summation device 70 is connected to an automatic pilot control means 71 which includes an autopilot reference signal providing means in order to provide an output from the means 71 that is representative of the deviations of the aircraft from a predetermined reference attitude. The means 71, for example, may be the elevator channel of an automatic pilot flight control system of the type shown in U.S. Patent 2,808,999 issued October 8, 1957 in the name of P. J. Chenery entitled, Automatic Flight Control Apparatus.

In that event, a reference signal representative of the desired pitch attitude is established by adjusting the reference pitch knob 72. With the automatic pilot control means 71 responsive to the position of the elevator control surface 21 by means of the feedback connection 74, the signal from the means 71 has an amplitude and polarity representative of the magnitude and direction respectively of the deviation of the aircraft from a predetermined reference pitch attitude. This deviation signal and the signal from the integrator 63 is algebraically combined in the summation device 70 and applied as a control signal to the elevator servo system 73 to position the elevator control surface 21.

In operation, with the control stick 25 held stationary and the pilot's arm immobilized assuming the pilot wishes to command a pitch-up attitude of the aircraft without changing the fuel flow to the engine, he initially gates the system to prevent signals from the summing amplifier 40 from being applied to the engine servo system 67 by flexing his jaw muscles. He thereby provides a signal from the pick-off 50 which is amplified in the amplifier 51 and rectified in the rectifier 52 to condition the flip flop 53 to its bistable state which provides a signal only on the lead 56 and none on the lead 54. By this arrangement, the AND circuit 57 will conduct while the AND circuit 55 will prevent conduction of the signal from the summing amplifier 40 to their respective servo systems 67 and 73.

The pilot 22 now tries to pull back on the control stick 25 as viewed in FIG. 3 thereby tensing his biceps and relaxing his triceps. The degree of activity of the bicep muscles is sensed by the pick-off 34 while the degree of inactivity of the tricep muscles is sensed by the pick-off 35. The signal from the pick-off 34 after being amplified in amplifier 41 and rectified in rectifier 42 is applied directly to the summing amplifier 40 while the signal from the pick-off 35 after being amplified and rectified is inverted in the inverter 45 and then applied to the summing amplifier 40. These signals are summed in the summing amplifier 40 to provide an output signal which is the difference therebetween, and of a polarity, in this case, to command a pitch-up attitude. With said signals applied to both of its input terminals, the AND circuit 57 conducts and with the NOT circuit 61 also in a conductive state, the signal passed to the integrator 63 and where it is integrated then compared with the deviation signal from the means 71 in the summation device 70. The algebraic summation thereof is a control signal which is applied to the elevator servo system 73 to drive the elevator control surface 21 until the pitch-up attitude of the aircraft as commanded by the pilot 22 is established.

When the pilot desires to control the performance of the engine 20 in lieu of the pitch attitude of the aircraft he flexes his jaw muscles again thereby providing a signal from the pick-off 50 which places the flip flop 52 in its other stable condition. This provides a signal on the lead 54 and none on the lead 56 thereby permitting the signal from the summing amplifier 40 to be applied through the AND circuit 55 to the engine servo system 67 while the AND circuit 57 is non-conductive and precludes passage of the signals to the elevator servo system 73.

The embodiment shown in FIG. 3 also provides for automatic recovery of the aircraft in the event the human pilot becomes unconscious due to the high acceleration effects. When the pilot 22 is conscious, his head is maintained erect by his neck muscles and the degree of activity of his neck muscles is sensed by a fourth myoelectric pick-off 75 mounted contiguous therewith. The signal from the pick-off 75 is amplified in an amplifier 76 and applied to a triggering circuit 77 to trigger an automatic recovery system 78 when the amplified signal from the amplifier signal 76 goes below a threshold bias level established by a threshold bias means 79, the latter being connected to the trigger circuit 77. When the pilot's head slumps and his neck muscles relax, the signal sensed by the pick-off 75 goes below the bias established by the biasing means 79 and the automatic recovery system 78 is triggered by the signal through the triggering device 77 thereby automatically initiating recovery.

Another myoelectric pick-off 80 is mounted contiguous with a neutral portion of the pilot's anatomy in order to provide a signal which establishes a predetermined or ground potential for the system. The pick-off 80 is connected to an equipment ground or chassis.

Figure 4:
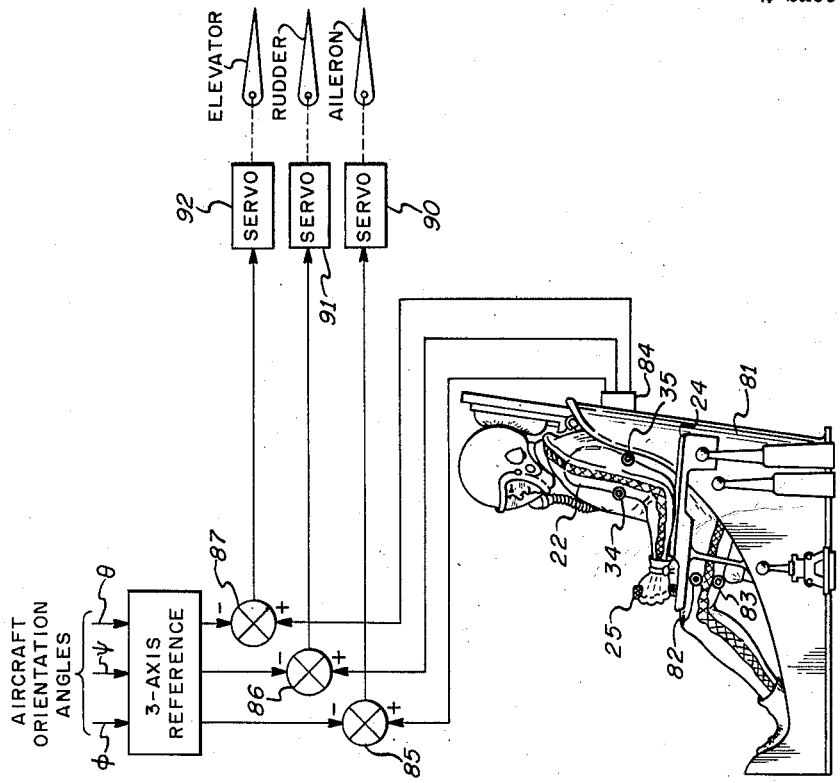
FIG. 4 is a schematic diagram showing a myoelectric control system in block form for controlling an aircraft about three axes.

Referring now to FIG. 4, a three axis myoelectric aircraft control system is schematically shown embodying the principles of the present invention. The human pilot 22 is seated in an ejectable pilot capsule 81 upon which an arm support 24 is attached. The control stick 25 is mounted on the support 24 in a manner shown in FIG. 3. Myoelectric pick-offs 34 and 35 are mounted contiguous with the biceps and triceps of the upper arm 22 in order to provide command signals for controlling the pitch attitude of the aircraft as explained with respect to the system of FIG. 3. Myoelectric pick-offs 82 and 83 are mounted contiguous with the agonist and antagonist muscles of the thigh of the pilot 22 to provide command signals for controlling the turning of the aircraft. The signals from the pick-offs 34, 35, 82 and 83 are connected through a breakaway connection to algebraic summation devices 85, 86 and 87. The other input terminals of the algebraic summation devices 85, 86 and 87 are responsive respectively to signals representative of the deviations from the reference setting of the aircraft's roll, yaw and pitch attitudes respectively established by a three axis reference device 88. The control signals from the summation devices 85, 86 and 87 are applied to respective aileron, yaw and elevator servo systems 90, 91 and 92 which position the respective control surfaces in directions established by the pilot's command signals.

Although the embodiment of FIG. 3 discloses the invention applied to two control channels, it will be appreciated that the invention is equally applicable to a greater number of control channels or functions by expanding the disclosed techniques through the use of conventional techniques. Further, additional functions and/or additional channels can be controlled by muscles or pairs of muscles. The switch 50, although disclosed as actuated by a jaw muscle, could be actuated by any suitable muscle or in certain instances, a manual toggle switch might be preferable. While the switch 75 is disclosed as actuating a recovery system 78, it could actuate an alarm system or operate to revive the human pilot.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft flight control system adapted to be controlled by a human pilot, myoelectric muscle activity sensing means adapted to be placed on predetermined muscles of said pilot and directly responsive to the myoelectric potential developed by the muscle activity for providing an electrical signal representative of the degree of activity of said muscles, amplifying means responsive to said signal for providing an amplified version thereof, and servo means responsive to said amplified signal for controlling said system in accordance therewith.

2. In an aircraft flight control system adapted to be controlled by a human pilot, myoelectric muscle activity sensing means adapted to be placed on predetermined muscles of said pilot and directly responsive to the myoelectric potential developed by the muscle activity for providing an electrical signal representative of the degree of activity of said muscles, amplifying means responsive to said signal for providing an amplified version thereof, means including reference signal providing means responsive to the performance of said aircraft for providing a signal representative of the deviation from a predetermined condition of said aircraft, means responsive to said amplified muscle signal and said deviation signal for providing a control signal in accordance with the algebraic sum thereof, and servo means responsive to said control signal for controlling said system in accordance therewith.

3. In an aircraft flight control system adapted to be controlled by a human pilot, myoelectric muscle activity sensing means adapted to be placed on predetermined muscles of said pilot and directly responsive to the myoelectric potential developed by the muscle activity for providing an electrical signal representative of the degree of activity of said muscles, amplifying means responsive to said signal for providing an amplified version thereof, rectifying means responsive to said amplified signal for providing a rectified version thereof, integrating means responsive to said rectified signal for providing a signal representative of the integral thereof, means including reference signal providing means responsive to the performance of said aircraft for providing a signal representative of the deviation of said aircraft from a predetermined reference condition, means responsive to said rectified muscle signal and said deviation signal for providing a control signal in accordance with the algebraic sum thereof, and servo means responsive to said control signal for controlling said system in accordance therewith.

4. In a device adapted to be controlled by a human operator wherein the human operator is substantially immobilized, first myoelectric muscle activity sensing means adapted to be placed on predetermined agonist muscles of said operator and directly responsive to the myoelectric potential developed by the muscle activity for providing a first electrical signal representative of the degree of activity of said agonist muscles, second myoelectric muscle activity sensing means adapted to be placed on predetermined antagonist muscles of said operator and directly responsive to the myoelectric potential developed by the muscle activity for providing a second electrical signal representative of the degree of activity of said antagonist muscles, said agonist and antagonist muscles forming a related pair, first and second amplifying means responsive to said first and second electrical signals respectively for providing amplified versions thereof, first and second rectifying means responsive to said first and second amplified signals respectively for providing rectified versions thereof, one of said rectifying means including polarity inverting means responsive to one of said rectified signals for providing a signal having an inverted polarity with respect to the other, means responsive to said polarity inverted signal and said other rectified signal for providing a control signal in accordance with the summation thereof, and means responsive to said control signal for controlling said device in accordance with the polarity of said control signal.

5. In an aircraft flight control system adapted to be controlled by a human pilot, first muscle activity sensing means adapted to be disposed adjacent first predetermined agonist muscles of said pilot for providing a first electrical signal representative of the degree of activity of said agonist muscles, second muscle activity sensing means adapted to be disposed adjacent predetermined antagonist muscles of said pilot for providing a second electrical signal representative of the degree of activity of said antagonist muscles, said agonist and antagonist muscles forming a related pair, first and second amplifying means responsive to said first and second electrical signals respectively for providing amplified versions thereof, first and second rectifying means responsive to said first and second amplified signals respectively for providing rectified versions thereof, polarity inverting means responsive to one of said rectified signals for providing a signal having an inverted polarity with respect to the other, summing means responsive to said other rectified signal and said polarity inverted signal for providing a signal in accordance with the summation thereof, integrating means responsive to said summation signal for providing a signal representative of the integral thereof, means including reference signal providing means responsive to the performance of said aircraft for providing a signal representative of the deviation of said aircraft from a predetermined reference condition, means responsive to said integral signal and said deviation signal for providing a control signal in accordance with the algebraic sum thereof, and servo means responsive to said control signal for controlling said system in accordance with the polarity of said control signal.

6. In a system as claimed in claim 5 including third muscle activity sensing means adapted to be disposed adjacent predetermined muscles of said pilot for providing a third electrical signal representative of the degree of activity of said muscles, and means responsive to said agonist and antagonist signals and said third electrical signal for selectively rendering said agonist and antagonist signals ineffective in accordance with said third signal.

7. In a system as claimed in claim 6 including fourth muscle activity sensing means adapted to be disposed adjacent predetermined muscles of said pilot for providing a fourth electrical signal representative of the degree of activity of said muscles, and means including automatic recovery system means responsive to said fourth signal for automatically initiating recovery action when said fourth signal reaches a predetermined condition.

8. In an aircraft flight control system adapted to be controlled by a human pilot, first muscle activity sensing means adapted to be disposed adjacent first predetermined agonist muscles of said pilot for providing a first electrical signal representative of the degree of activity of said agonist muscles, second muscle activity sensing means adapted to be disposed adjacent predetermined antagonist muscles of said pilot for providing a second electrical signal representative of the degree of activity of said antagonist muscles, said agonist and antagonist muscles forming a related pair, first and second amplifying means responsive to said first and second electrical signals respectively for providing amplified versions thereof, first and second rectifying means responsive to said first and second amplified signals respectively for providing rectified versions thereof, polarity inverting means responsive to one of said rectified signals for providing a signal having an inverted polarity with respect to the other, summing means responsive to said other rectified signal and said polarity inverted signal for providing a signal in accordance with the summation thereof, third muscle activity sensing means adapted to be disposed adjacent predetermined muscles of said pilot for providing a third electrical signal representative of the degree of activity of said muscles, amplifying means responsive to said third signal for providing an amplified version thereof, bistable multivibrator means responsive to said third rectified signal and having two output terminals for providing two signals each one representing a respective one of said two stable states, first and second AND circuits responsive to said summation signal and one of said multivibrator signals respectively, manually operable switching means, first and second NOT circuits connected to said switching means and one of said AND circuits respectively, first and second integrating means connected to said first and second NOT circuits respectively for selectively providing a signal representative of the integral thereof, means including reference signal providing means responsive to the performance of said aircraft for providing a signal representative of the deviation of said aircraft from a predetermined reference condition, means responsive to said integral signal and said deviation signal for providing a control signal in accordance with the algebraic sum thereof, and servo means responsive to said control signal for controlling said system in accordance with the polarity of said control signal.

9. In a system as claimed in claim 8 included fourth muscle activity sensing means adapted to be disposed adjacent predetermined muscles of said pilot for providing a fourth electrical signal representative of the degree of activity of said muscles, amplifying means responsive to said fourth signal for providing an amplified version thereof, means responsive to said amplified fourth signal for providing a recovery signal when said fourth signal is below a predetermined magnitude, and automatic recovery means responsive to said recovery signal for automatically initiating recovery action.

10. In an aircraft flight control system adapted to be controlled by a human pilot, a first pair of myoelectric muscle activity sensing means adapted to be placed on a first predetermined pair of related agonist and antagonist muscles of said pilot and directly responsive to the myoelectric potential developed by the muscle activity for providing first electrical signals representative of the degree of activity of said first pair of muscles, a second pair of myoelectric muscle activity sensing means adapted to be placed on a second predetermined pair of related agonist and antagonist muscles of said pilot and directly responsive to the myoelectric potential developed by the muscle activity for providing second electrical signals representative of the degree of activity of said second pair of muscles, first and second amplifying means responsive to said first and second pair of electrical signals representatively for providing amplified versions thereof, means responsive to said first pair of amplified electrical signals for providing a signal representative of the commanded pitch attitude signal, means responsive to said second pair of amplified electrical signals for providing a signal representative of the commanded turn signal, and means including pitch and turn control servo means responsive respectively to said pitch and turn signals for controlling said aircraft in accordance therewith.

11. In an aircraft flight control system adapted to be controlled by a human pilot, a first pair of myoelectric muscle activity sensing means adapted to be placed on a first predetermined pair of related pitch command agonist and antagonist muscles of said pilot and directly responsive to the myoelectric potential developed by the muscle activity for providing first electrical signals representative of the degree of activity of said first pair of muscles, a second pair of myoelectric muscle activity sensing means adapted to be placed on a second predetermined pair of related roll command agonist and antagonist muscles of said pilot and directly responsive to the myoelectric potential developed by the muscle activity for providing second electrical signals representative of the degree of activity of said second pair of muscles, a third pair of muscle activity sensing means adapted to be placed on a third predetermined pair of related yaw agonist and antagonist muscles of said pilot for providing third electrical signals representative of the degree of activity of said third pair of muscles, first, second and third amplifying means responsive to said first, second and third pairs of electrical signals respectively for providing amplified versions thereof, means responsive to said first pair of amplified electrical signals for providing a signal representative of the commanded pitch attitude signal, means responsive to said second pair of amplified electrical signals for providing a signal representative of the commanded roll signal, means responsive to said third pair of amplified electrical signals for providing a signal representative of the commanded yaw signal, and means including pitch, roll and yaw servo means responsive respectively to said pitch, roll and yaw signals for controlling said aircraft in pitch, roll and yaw respectively in accordance therewith.

12. In a two channel control system adapted to be selectively controlled by a human operator wherein the human operator is substantially immobilized, first myoelectric muscle activity sensing means adapted to be placed on first predetermined muscles of said operator and directly responsive to the myoelectric potential developed by the muscle activity for providing a first electrical signal representative of the degree of activity of said first muscles, second myoelectric muscle activity sensing means adapted to be placed on second predetermined muscles of said operator and directly responsive to the myoelectric potential developed by the muscle activity for providing a second electrical signal representative of the degree of activity of said second muscles, third myoelectric muscle activity sensing means adapted to be placed on third predetermined muscles of said operator and directly responsive to the myoelectric potential developed by the muscle activity for providing a third electrical signal representative of the degree of activity of said third muscles, a first control channel nominally responsive to said first signal, a second control channel nominally responsive to said second signal, and means associated with said first and second channels and responsive to said third signal for selectively rendering said first and second channels responsive to said first and second signals in accordance with said third signals.

References Cited in the file of this patent

UNITED STATES PATENTS

| | | |
|---|---|---|
| 2,590,029 | Minorsky | Mar. 18, 1952 |
| 2,770,429 | Schuck et al. | Nov. 13, 1956 |
| 2,848,992 | Pigeon | Aug. 26, 1958 |
| 2,895,086 | Pettit | July 14, 1959 |
| 2,986,361 | Codding | May 30, 1961 |